(12) United States Patent
Wakabayashi et al.

(10) Patent No.: US 11,874,524 B2
(45) Date of Patent: Jan. 16, 2024

(54) METHOD OF DRIVING OPTICAL DEVICE, OPTICAL SYSTEM, AND DISPLAY

(71) Applicant: SEIKO EPSON CORPORATION, Tokyo (JP)

(72) Inventors: Shinichi Wakabayashi, Suwa (JP); Masatoshi Ito, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 229 days.

(21) Appl. No.: 17/531,433

(22) Filed: Nov. 19, 2021

(65) Prior Publication Data
US 2022/0163756 A1 May 26, 2022

(30) Foreign Application Priority Data
Nov. 20, 2020 (JP) ................................. 2020-193280

(51) Int. Cl.
*G02B 7/10* (2021.01)
*G02B 7/02* (2021.01)
*H04N 23/68* (2023.01)

(52) U.S. Cl.
CPC ............. *G02B 7/102* (2013.01); *G02B 7/023* (2013.01); *H04N 23/687* (2023.01)

(58) Field of Classification Search
CPC .... G02B 7/102; G02B 7/023; G02B 26/0875; H04N 23/687; G03B 21/142
See application file for complete search history.

(56) References Cited

U.S. PATENT DOCUMENTS

| | | | |
|---|---|---|---|
| 11,126,069 B2 | 9/2021 | Chang et al. | |
| 2016/0091773 A1 | 3/2016 | Mizoguchi et al. | |
| 2016/0227177 A1 | 8/2016 | Mizoguchi | |
| 2016/0370575 A1* | 12/2016 | Lin | G02B 26/085 |
| 2017/0017092 A1 | 1/2017 | Mikawa | |
| 2017/0026623 A1 | 1/2017 | Nishi et al. | |
| 2020/0174246 A1 | 6/2020 | Wakabayashi et al. | |
| 2021/0096449 A1 | 4/2021 | Hirakura | |
| 2022/0137493 A1 | 5/2022 | Chen et al. | |

FOREIGN PATENT DOCUMENTS

| | | |
|---|---|---|
| JP | 2008-116678 A | 5/2008 |
| JP | 2014-041234 A | 3/2014 |
| JP | 2016-071232 A | 5/2016 |
| JP | 2016-143989 A | 8/2016 |
| JP | 2020-034586 A | 3/2020 |
| JP | 2020-091343 A | 6/2020 |

OTHER PUBLICATIONS

Feb. 23, 2023 Office Action issued in U.S. Appl. No. 17/530,996.
Jun. 8, 2023 Office Action Issued in U.S. Appl. No. 17/530,996.

* cited by examiner

*Primary Examiner* — James C. Jones
(74) *Attorney, Agent, or Firm* — Oliff PLC

(57) ABSTRACT

A method of driving an optical device is provided. The optical device including an optical member, a first actuator which displaces the optical member around a first axis, and a second actuator which displaces the optical member around a second axis perpendicular to the first axis. The method including exciting the first actuator by inputting a first drive signal to the first actuator, exciting the second actuator by inputting a second drive signal to the second actuator, and setting a value of the second drive signal to a value for substantially stopping exciting the second actuator in a period of the exciting the first actuator.

9 Claims, 9 Drawing Sheets

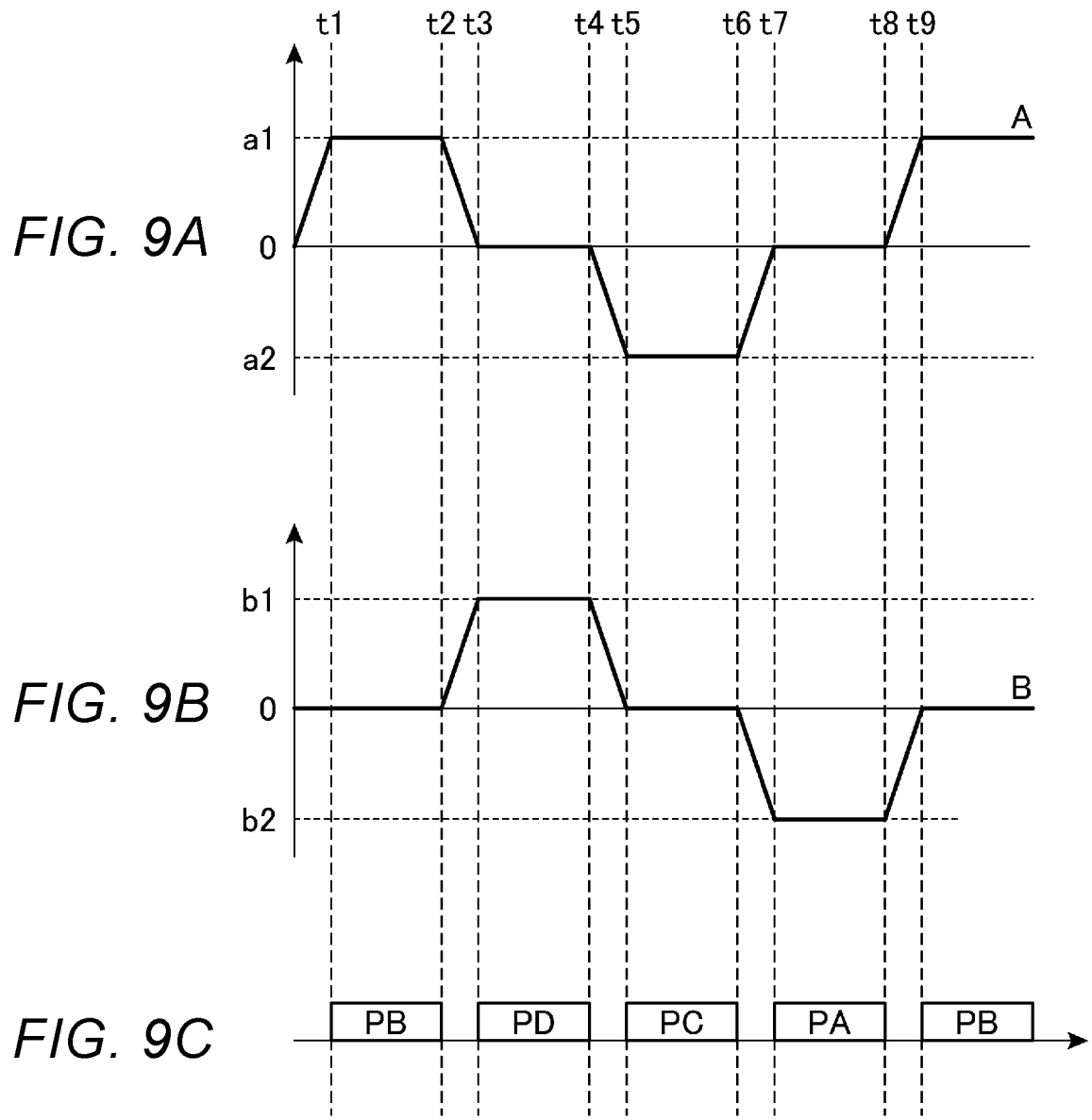

METHOD OF DRIVING OPTICAL DEVICE, OPTICAL SYSTEM, AND DISPLAY

The present application is based on, and claims priority from JP Application Serial Number 2020-193280, filed Nov. 20, 2020, the disclosure of which is hereby incorporated by reference herein in its entirety.

BACKGROUND

1. Technical Field

The present disclosure relates to a method of driving an optical device, an optical system, and a display.

2. Related Art

In the past, there has been known a display which oscillates an optical member to shift a light path of image light entering the optical member to thereby increase the resolution. For example, in JP-A-2020-091343 (Document 1), a glass plate is oscillated by two actuators to perform a light path shifting action of shifting the light path of the image light. According to this configuration, by moving a single pixel to four positions of positions P1, P2, P3, and P4, four pixels smaller in size than the single pixel are apparently displayed.

In the configuration described in Document 1, alight path shifting action in which oscillations of the glass plate are combined with each other is performed in accordance with drive signals to be supplied to a first actuator and a second actuator. In this configuration, since voltages are applied to the two actuators, there is a problem that the power consumption is high.

SUMMARY

An aspect of the present application example is directed to a method of driving an optical device including an optical member having an optical area which has a rectangular shape in a plan view, and which light enters, a first actuator configured to displace the optical member around a first axis which passes through a center of the optical area in the plan view, and which forms an angle smaller than 90° with a first side of the optical area, and a second actuator configured to displace the optical member around a second axis which passes through the center of the optical area, and which is perpendicular to the first axis. The method includes inputting a first drive signal into the first actuator to thereby excite the first actuator, inputting a second drive signal into the second actuator to thereby excite the second actuator, and setting a value of the second drive signal to a value for substantially stopping exciting the second actuator in a period of exciting the first actuator.

Another aspect of the present application example is directed to an optical system including an optical device including an optical member having an optical area which has a rectangular shape in a plan view, and which light enters, a first actuator configured to displace the optical member around a first axis which passes through a center of the optical area in the plan view, and which forms an angle smaller than 90° with a first side of the optical area, and a second actuator configured to displace the optical member around a second axis which passes through the center of the optical area, and which is perpendicular to the first axis, and a drive circuit, wherein the drive circuit performs outputting a first drive signal to the first actuator to thereby excite the first actuator, outputting a second drive signal to the second actuator to thereby excite the second actuator, and setting a value of the second drive signal to a value for substantially stopping exciting the second actuator in a period of exciting the first actuator.

Another aspect of the present application example is directed to a display including a light source, a light modulator configured to modulate light emitted from the light source, an optical device including an optical member having an optical area which has a rectangular shape in a plan view, and which the light modulated by the light modulator enters, a first actuator configured to displace the optical member around a first axis which passes through a center of the optical area in the plan view, and which forms an angle smaller than 90° with a first side of the optical area, and a second actuator configured to displace the optical member around a second axis which passes through the center of the optical area, and which is perpendicular to the first axis, a drive circuit, and an optical system configured to transmit the light transmitted through the optical device, wherein the drive circuit performs outputting a first drive signal to the first actuator to thereby excite the first actuator, outputting a second drive signal to the second actuator to thereby excite the second actuator, and setting a value of the second drive signal to a value for substantially stopping exciting the second actuator in a period of exciting the first actuator.

BRIEF DESCRIPTION OF THE DRAWINGS

FIGS. 9A to 9C are timing charts showing waveforms of drive signals and changes of a position of a pixel.

DESCRIPTION OF AN EXEMPLARY EMBODIMENT

1. Overall Configuration of Projector

An exemplary embodiment of the present disclosure will hereinafter be described with reference to the drawings.

Figure 1:
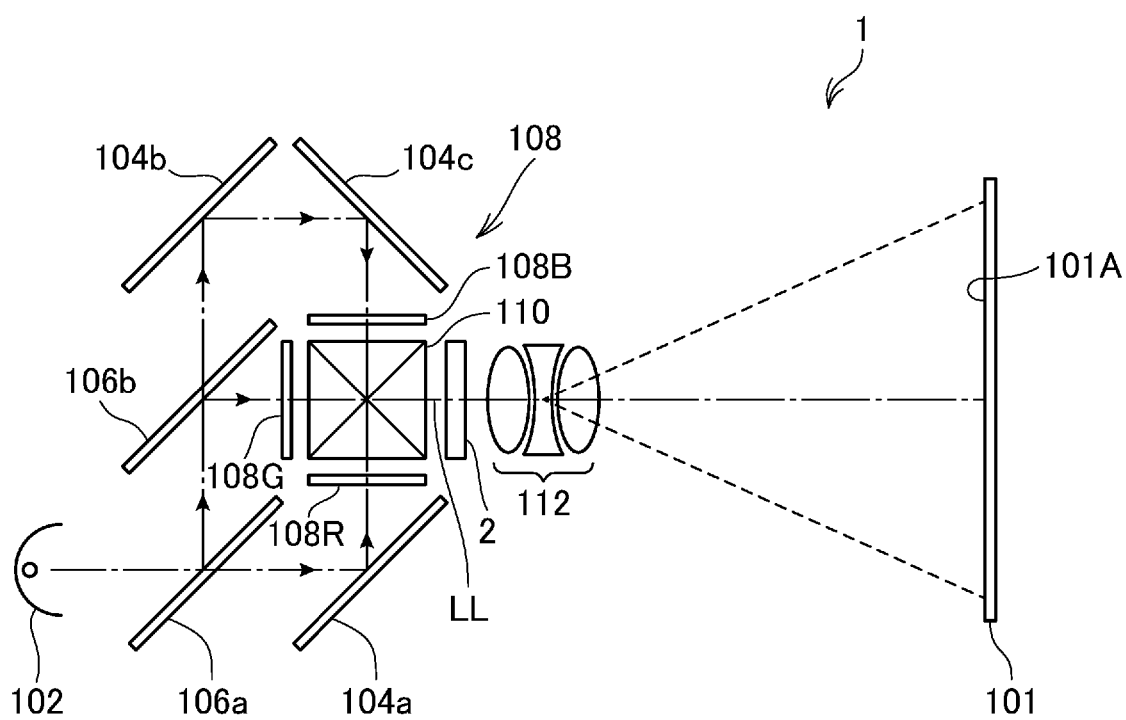
FIG. 1 is an explanatory diagram showing an optical configuration of a projector according to a first embodiment.

FIG. 1 is an explanatory diagram showing an optical configuration of a projector 1 as an example of a display according to the present embodiment.

The projector 1 is provided with a light source 102 and a light modulator 108 for modulating the light emitted by the light source 102 based on an image signal input from the outside, and projects a projection image 101A on a screen 101. As the light modulator of the projector 1, there can be used an LCD (Liquid Crystal Display), a digital micromirror device (DMD), and so on. In the present embodiment, the projector 1 provided with liquid crystal display elements 108R, 108G, and 108B as the light modulator 108 will be described as an example.

The projector 1 is provided with mirrors 104a, 104b, and 104c, dichroic mirrors 106a, 106b, a dichroic prism 110, a light path shifting device 2, and a projection optical system 112.

As the light source 102, there can be cited, for example, a halogen lamp, a mercury lamp, a light emitting diode (LED), and a laser source. Further, as the light source 102, there is used a device for emitting white light. The light emitted from the light source 102 is separated by, for example, the dichroic mirror 106a into red light (R) and the rest of the light. The red light is reflected by the mirror 104a, and then enters the liquid crystal display element 108R, and the rest of the light is further separated by the dichroic mirror 106b into green light (G) and blue light (B). The green light enters the liquid crystal display element 108G, and the blue light is reflected by the mirrors 104b, 104c, and then enters the liquid crystal display element 108B. The dichroic mirrors 106a, 106b correspond to a spectral element for separating the light emitted by the light source 102 into the red light (R), the green light (G), and the blue light (B).

The liquid crystal display elements 108R, 108G, and 108B are transmissive spatial light modulators corresponding respectively to primary colors of R, G, and B. The liquid crystal display elements 108R, 108G, and 108B each have a liquid crystal panel provided with pixels arranged in, for example, a 1080×1920 matrix. In each of the pixels, the light intensity of the transmitted light with respect to the incident light is controlled, and in each of the liquid crystal display elements 108R, 108G, and 108B, the light intensity distribution of all of the pixels is controlled in a coordinated manner. The light beams spatially modulated by such liquid crystal display elements 108R, 108G, and 108B are combined with each other by the dichroic prism 110, and full-color image light LL is emitted from the dichroic prism 110. Then, the image light LL thus emitted is projected on the screen 101 in an enlarged manner by the projection optical system 112. The projection optical system 112 corresponds to an example of an optical system.

The projection optical system 112 projects the light modulated by the liquid crystal display elements 108R, 108G, and 108B on the screen 101 to form the projection image 101A on the screen 101. An action of the projector 1 forming the projection image 101A corresponds to performing display.

The projection optical system 112 is provided with at least one lens. The projection optical system 112 can also be an optical system provided with at least one or more mirrors, or can also be an optical system provided with one or more lenses and one or more mirrors. The projection optical system 112 can be provided with a mechanism for adjusting the focus on the screen 101.

The light path shifting device 2 is disposed between the dichroic prism 110 and the projection optical system 112. It is possible for the projector 1 to display an image higher in resolution than the liquid crystal display elements 108R, 108G, and 108B on the screen 101 by performing a shift of the light path of the image light LL using the light path shifting device 2, namely a so-called light path shift. For example, when using the liquid crystal display elements 108R, 108G, 108B compatible with the full high definition of displaying an image in 1920×1080 pixels as described above, it is possible to display an image compatible with the 4K resolution on the screen 101. The light path shifting device 2 corresponds to an example of an optical device.

2. Aspect of Light Path Shift

The high resolution achieved by the light path shift will be described with reference to FIG. 2.

Figure 2:
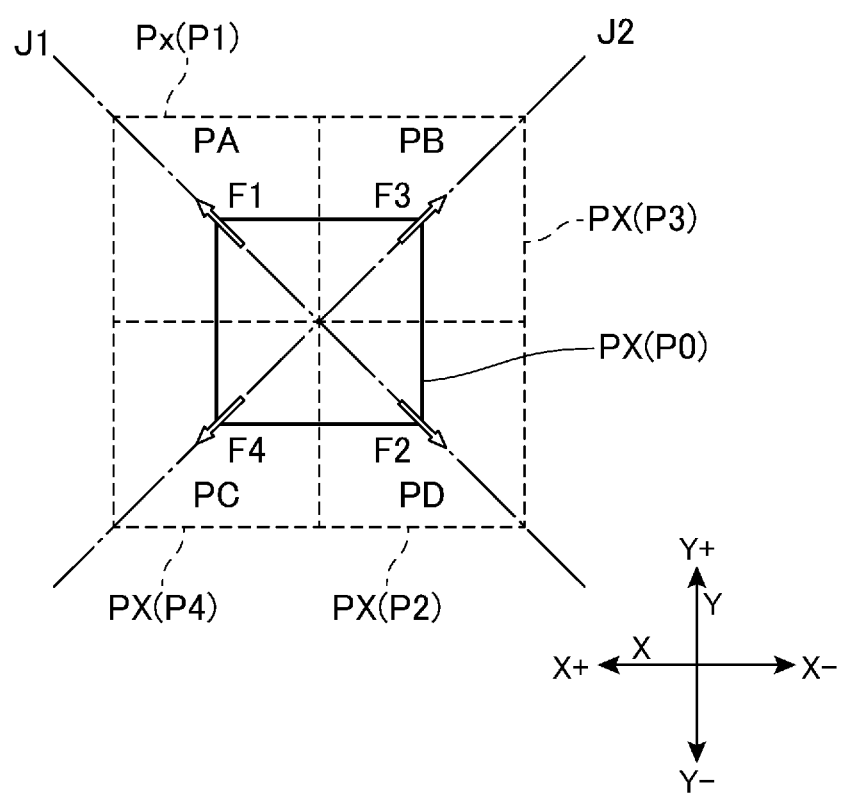
FIG. 2 is an explanatory diagram showing a light path shift by a light path shifting device.

FIG. 2 is an explanatory diagram showing the light path shift by the light path shifting device 2. As described later, the light path shifting device 2 has a glass plate 30 as a light transmissive optical member for transmitting the image light LL. The light path shifting device 2 changes the posture of the glass plate 30 to thereby shift the light path of the image light LL using the refraction of light.

In FIG. 2, there are shown an X axis and a Y axis perpendicular to each other. The X axis and the Y axis correspond to arrangement directions of the pixels in a display area of each of the liquid crystal display elements 108R, 108G, and 108B. For example, the liquid crystal display elements 108R, 108G, and 108B each have 1920 pixels along the X axis, and 1080 pixels along the Y axis. The X axis and the Y axis correspond respectively to a horizontal direction and a vertical direction of the projection image 101A to be projected on the screen 101. Here, one direction along the X axis is defined as an X+ direction, and the opposite direction is defined as an X− direction. Further, one direction along the Y axis is defined as a Y+ direction, and the opposite direction is defined as a Y− direction.

The position of the glass plate 30 in the state in which the light path shifting device 2 does not displace the glass plate 30 is defined as a reference position. At the reference position, the glass plate 30 is parallel to an X-Y plane. The light path shifting device 2 in the present embodiment oscillates the glass plate 30 to thereby guide the image light LL to a predetermined position.

FIG. 2 schematically shows how the pixel Px included in the image light LL transmitted through the glass plate 30 is shifted. The position of the pixel Px when the glass plate 30 is located at the reference position is defined as a position P0. A first position P1, a second position P2, a third position P3, and a fourth position P4 are each a position to which the image light LL of the pixel Px is guided due to the oscillation of the glass plate 30. For example, the first position P1 is a position shifted toward the X+ direction and the Y+ direction as much as a half pixel with respect to the position P0. The second position P2 is a position shifted toward the X− direction and the Y− direction as much as a half pixel with respect to the position P0. The third position P3 is a position shifted toward the X− direction and the Y+ direction as much as a half pixel with respect to the position P0, and the fourth position P4 is a position shifted toward the X+ direction and the Y− direction as much as a half pixel with respect to the position P0. FIG. 2 corresponds to a diagram of the glass plate 30 viewed from the dichroic prism 110.

The first position P1 corresponds to a third position, and the second position P2 corresponds to a fourth position. Conversely, it is possible to adopt a configuration in which the first position P1 corresponds to the fourth position, and the second position P2 corresponds to the third position. The third position P3 corresponds to a first position, and the fourth position P4 corresponds to a second position. Conversely, it is possible to adopt a configuration in which the third position P3 corresponds to the second position, and the fourth position P4 corresponds to the first position.

A first axis J1 and a second axis J2 shown in FIG. 2 are each an axis of the oscillation of the glass plate 30, and are each an imaginary axis line set in a mechanism with which the light path shifting device 2 oscillates the glass plate 30.

At the reference position, the glass plate 30 is not tilted around the first axis J1 or the second axis J2.

The glass plate 30 is displaced around the first axis J1 due to the action of a first actuator 6 described later. The directions of the displacement of the glass plate 30 are a normal direction and a reverse direction. The normal direction around the first axis J1 is a direction in which a portion at the X− side and the Y+ side of the glass plate 30 is displaced frontward with respect to the X-Y plane. When the glass plate 30 is displaced toward the normal direction around the first axis J1, the pixel Px moves in a third direction F3 toward the third position P3. The reverse direction around the first axis J1 is a direction in which a portion at the X+ side and the Y− side of the glass plate 30 is displaced frontward with respect to the X-Y plane. When the glass plate 30 is displaced toward the reverse direction around the first axis J1, the pixel Px moves in a fourth direction F4 toward the fourth position P4. The third direction F3 and the fourth direction F4 are perpendicular to the first axis J1 and are opposite to each other.

The glass plate 30 is displaced around the second axis J2 due to the action of a second actuator 7 described later. The directions of the displacement of the glass plate 30 are a normal direction and a reverse direction.

The normal direction around the second axis J2 is a direction in which a portion at the X− side and the Y− side of the glass plate 30 is displaced frontward with respect to the X-Y plane. When the glass plate 30 is displaced toward the normal direction around the second axis J2, the pixel Px moves in a second direction F2 toward the second position P2. The reverse direction around the second axis J2 is a direction in which a portion at the X+ side and the Y+ side of the glass plate 30 is displaced frontward with respect to the X-Y plane. When the glass plate 30 is displaced toward the reverse direction around the second axis J2, the pixel Px moves in a first direction F1 toward the first position P1. The first direction F1 and the second direction F2 are perpendicular to the second axis J2 and are opposite to each other.

The projector 1 performs the shifts of the light path in the first direction F1, the third direction F3, the second direction F2, and the fourth direction F4 in sequence to thereby increase the apparent number of pixels, and thus, it is possible to achieve the high resolution of the projection image 101A to be projected on the screen 101. For example, the projector 1 displays an image PA at the first position P1, displays an image PB at the third position P3, displays an image PD at the second position P2, and displays an image PC at the fourth position P4 using the pixel Px. Due to the series of display, in the projection image 101A, the four images PA, PB, PD, and PC are displayed at the four positions shifted as much as a half pixel from each other with the single pixel Px. Thus, the projection image 101A is visually recognized as an image higher in resolution constituted by pixels smaller than the pixel Px.

When displaying the projection image 101A with the frequency of 60 Hz as a whole, the projector 1 makes the liquid crystal display elements perform the display at 240 Hz as a quad rate, and shift the pixel Px in accordance with an update of the display. As shown in FIG. 2, when making the pixel Px perform the display in the order of the images PA, PB, PD, and PC, an action of moving the pixel Px in the first direction F1, an action of moving the pixel Px in the third direction F3, an action of moving the pixel Px in the second direction F2, and an action of moving the pixel Px in the fourth direction F4 are performed in sequence.

The actions described above are illustrative only, and the shift amount of the pixel Px is not limited to a half pixel, but can also be, for example, a fourth of length of the pixel Px, or three fourths thereof. Further, the diagram shows an example in which the pixel Px has a square shape, but it is sufficient for the pixel Px to have a rectangular shape. In this case, the shift amount in the X axis of the pixel Px can be set to, for example, a half or a fourth of the length of the side of the pixel Px parallel to the X axis. Further, the shift amount in the Y axis of the pixel Px can be set to a half or a fourth of the length of the side of the pixel Px parallel to the Y axis.

3. Functional Configuration of Projector

Figure 3:
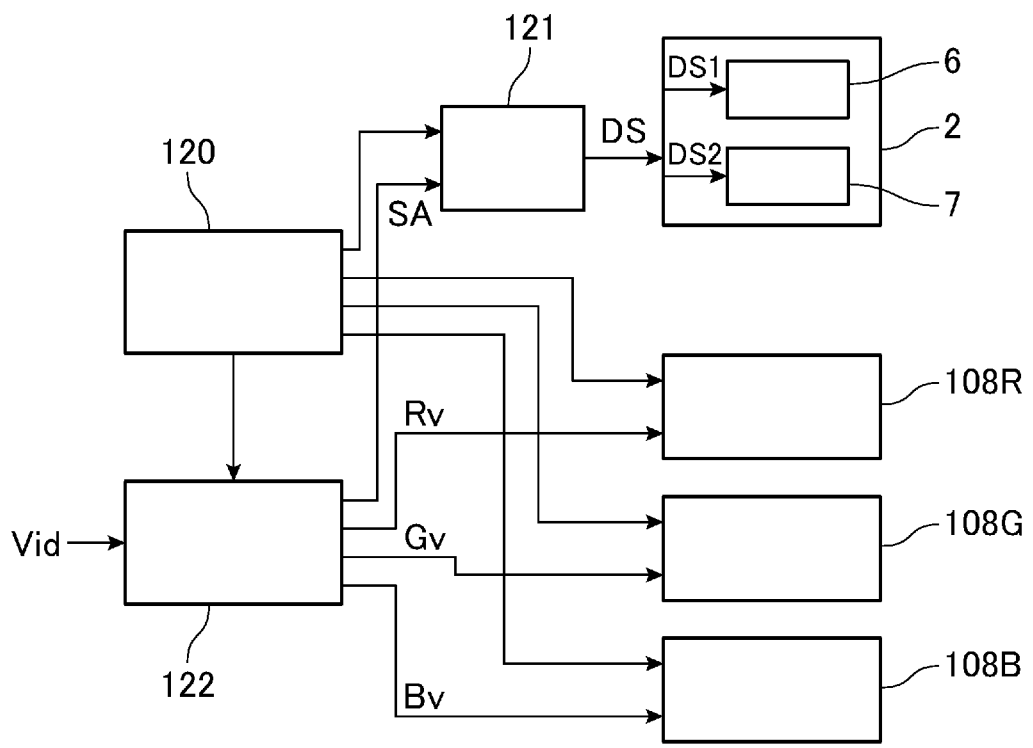
FIG. 3 is a functional block diagram of the projector.

FIG. 3 is a block diagram of the projector 1 shown in FIG. 1. The projector 1 is provided with a control circuit 120, a drive signal processing circuit 121, and an image signal processing circuit 122.

The control circuit 120 controls an operation of writing a data signal to the liquid crystal display elements 108R, 108G, and 108B, a light path shifting operation in the light path shifting device 2, an operation of generating the data signal in the image signal processing circuit 122, and so on. The drive signal processing circuit 121 is a drive circuit for supplying drive signals DS to the light path shifting device 2 based on a sync signal SA output by the image signal processing circuit 122. A configuration including the drive signal processing circuit 121 and the light path shifting device 2 combined with each other corresponds to an example of an optical system.

The image signal processing circuit 122 separates an image signal Vid supplied from an external device not shown into those for the three primary colors of R, G, and B, and at the same time, converts the result into data signals Rv, Gv, and Bv suitable to the operations of the respective liquid crystal display elements 108R, 108G, and 108B. Then, the data signals Rv, Gv, and Bv thus obtained by the conversion are supplied respectively to the liquid crystal display elements 108R, 108G, and 108B, and the liquid crystal display elements 108R, 108G, and 108B draw the image based on the data signals Rv, Gv, and Bv, respectively. The light emitted by the light source 102 is dispersed into the red light (R), the green light (G), and the blue light (B) as described above, and the colored light beams are modulated in accordance with the images drawn in the liquid crystal display elements 108R, 108G, and 108B, respectively.

The light path shifting device 2 is provided with the first actuator 6 and the second actuator 7 as drive sources for driving the glass plate 30. The drive signal processing circuit 121 outputs the drive signals DS to the first actuator 6 and the second actuator 7. The drive signals DS include a first drive signal DS1 for driving the first actuator 6 and a second drive signal DS2 for driving the second actuator 7. To the first actuator 6, there is input the first drive signal DS1, and to the second actuator 7, there is input the second drive signal DS2.

4. Configuration of Liquid Crystal Display Element

Figure 4:
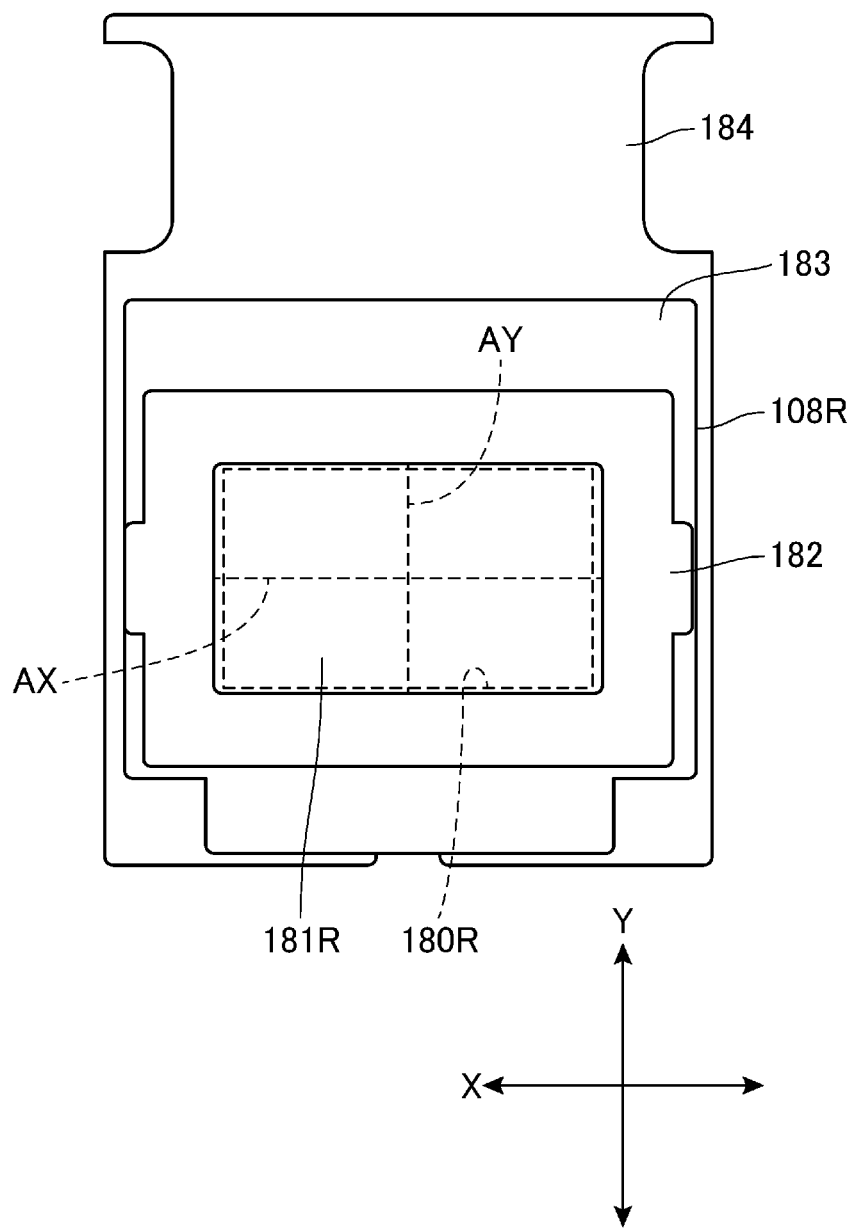
FIG. 4 is a plan view showing a configuration of a liquid crystal display element.

FIG. 4 is a plan view showing a configuration of the liquid crystal display element 108R. Since the liquid crystal display elements 108R, 108G, and 108B all have a common configuration, the illustration and the description of the liquid crystal display element 108G and the liquid crystal display element 108B will be omitted.

The liquid crystal display element 108R has a transmissive liquid crystal display panel 181R. The liquid crystal display panel 181R is a liquid crystal panel for modulating the red light (R). The liquid crystal display panel 181R is fitted into a frame 182, and is coupled to a drive circuit not shown.

The frame 182 is supported by a bracket 183. The bracket 183 is a jig for fixing the frame 182 to a base member 184. The position where the bracket 183 is fixed to the base member 184 is adjustable, and by adjusting the attachment position of the bracket 183, it is possible to adjust the position of the liquid crystal display panel 181R.

The liquid crystal display panel 181R has a display area 180R for displaying an image. The display area 180R is an area where the image is formed in the liquid crystal display panel 181R, and the red light (R) obtained by dispersing the light emitted by the light source 102 is transmitted through the display area 180R to thereby be modulated. In the present embodiment, the display area 180R having a rectangular shape is formed in the liquid crystal display panel 181R. Therefore, the image light modulated by the liquid crystal display element 108R is transmitted through the display area 180R having the rectangular shape to turn to light forming the projection image 101A having the rectangular shape.

FIG. 4 illustrates an axis AX and an axis AY in the display area 180R. The axes AX, AY are each an imaginary axis line. The axis AX is parallel to the X axis in the display area 180R, and the axis AY is parallel to the Y axis in the display area 180R.

As described above, similarly to the liquid crystal display element 108R, in the liquid crystal display elements 108G, 108B, images are formed in respective display areas not shown. The shape of the display area, and the correspondence between the display area and the X and Y axes are common to the display area 180R.

5. Configuration of Light Path Shifting Device

Figure 5:
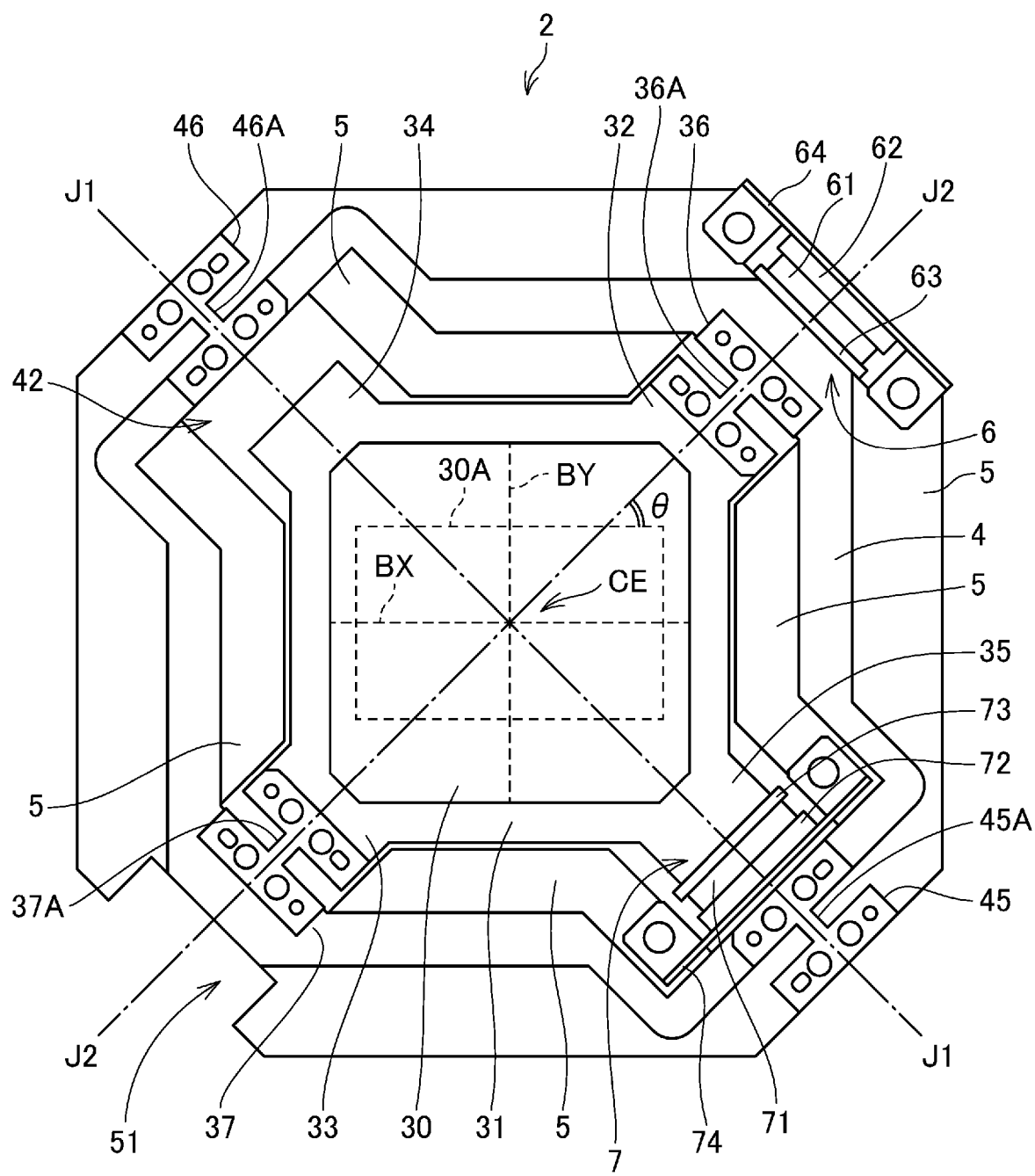
FIG. 5 is a plan view of the light path shifting device.
Figure 6:
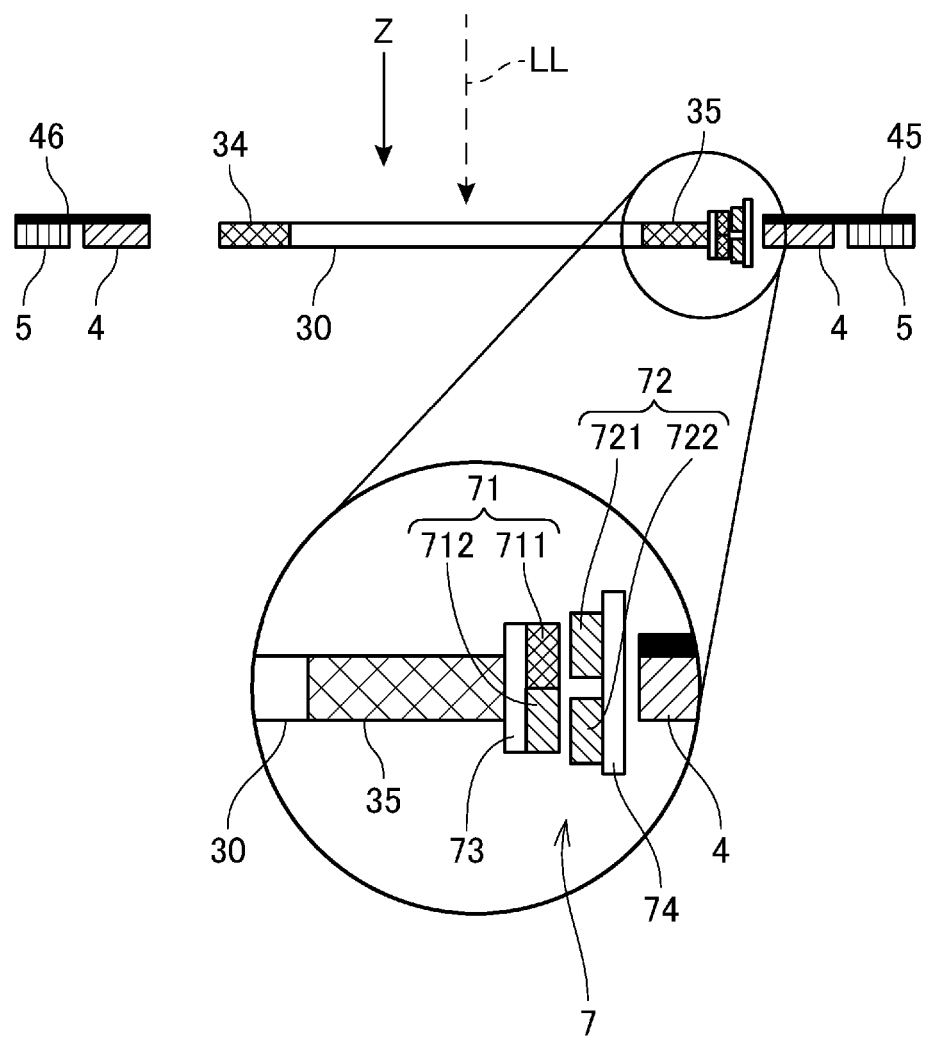
FIG. 6 is a partial cross-sectional view of the light path shifting device.
Figure 7:
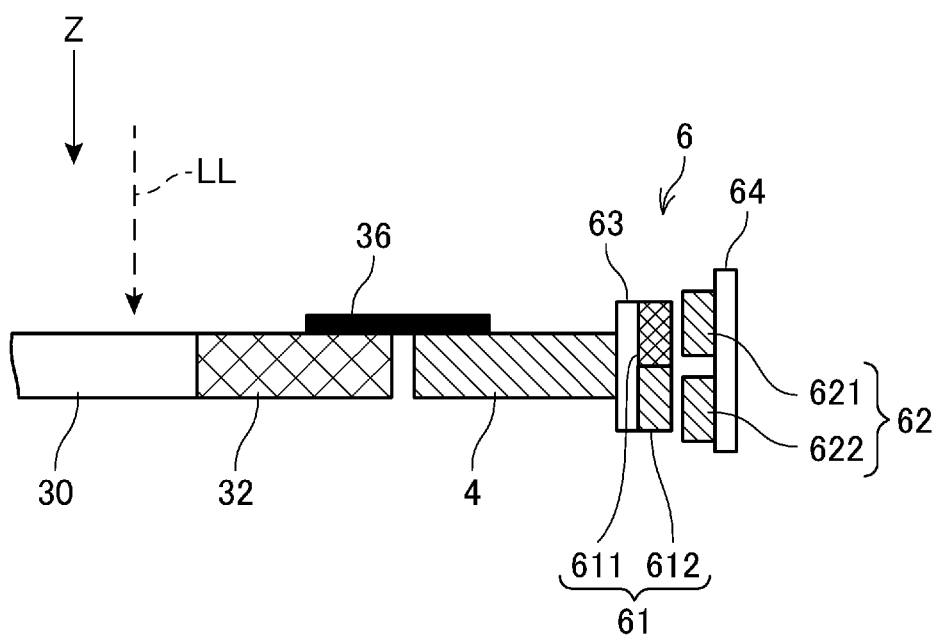
FIG. 7 is a partial enlarged cross-sectional view of the light path shifting device.

FIG. 5 is a plan view of the light path shifting device 2. FIG. 6 is a partial cross-sectional view of the light path shifting device 2. FIG. 7 is a partial enlarged cross-sectional view of the light path shifting device 2.

The light path shifting device 2 has the glass plate 30, and the glass plate 30 is supported by a first frame 31. The first frame 31 is a member which is made of metal or synthetic resin, and which has a frame-like shape.

The glass plate 30 is a light transmissive substrate having a light transmissive property, and is an optical member which the image light LL enters. As shown in FIG. 4, a red component of the image light LL is transmitted through the display area 180R to thereby be modulated into light forming an image having a rectangular shape. The same applies to a green component and a blue component of the image light LL. Therefore, the image light LL entering the glass plate 30 is transmitted through an optical area 30A having a rectangular shape in the glass plate 30. The center CE of the optical area 30A is a centroid in the plan view of the area where the image light LL is transmitted at the reference position. In the present embodiment, the center CE of the optical area 30A coincides with the center of the glass plate 30. The center CE can be a position at which the central axis of the image light LL emitted from the glass plate 30 and the glass plate 30 cross each other.

It is sufficient for the glass plate 30 to have a size and a shape including at least the optical area 30A, and it is possible for the planar shape of the glass plate 30 to be a circular shape or a variety of polygonal shapes including a rectangular shape.

It is preferable for an optical member provided to the light path shifting device 2 to substantially be colorless and transparent. In the present embodiment, an example of using the glass plate 30 as an example of the optical member will be described. As the glass plate 30, there can be used a variety of glass materials such as super white glass, borosilicate glass, or quartz glass. The optical member is only required to have a light transmissive property of transmitting the image light LL, and can be formed of a variety of types of crystalline materials such as quartz crystal or sapphire, or a resin material such as polycarbonate series resin or acrylic resin besides glass. When adopting glass as the material of the optical member, since the rigidity of the optical member is high, there is an advantage that it is possible to suppress a variation in shift amount of the light path when shifting the light path of the image light LL.

Further, in the glass plate 30, an antireflection film can be formed on a plane of incidence which the image light LL enters, and an exit surface from which the image light LL is emitted.

FIG. 5 illustrates an axis BX and an axis BY respectively representing the X direction and the Y direction in the optical area 30A of the glass plate 30. The axes BX, BY are imaginary axis lines corresponding to the axes AX, AY in the display area 180R of the liquid crystal display element 108R and the display areas not shown of the liquid crystal display elements 108G, 108B.

The light path shifting device 2 has the first axis J1 and the second axis J2. The first axis J1 and the second axis J2 are each an imaginary axis line forming the center of the rotation of the glass plate 30, and the first axis J1 passes through the center CE of the optical area 30A. The second axis J2 passes through the center CE, and crosses the first axis J1. In the present embodiment, the first axis J1 and the second axis J2 bisect each other at right angles at the center CE.

The light path shifting device 2 is provided with a second frame 4 for swingably supporting the first frame 31, a base member 5 for swingably supporting the second frame 4, and the first actuator 6 and the second actuator 7 for displacing the glass plate 30.

The base member 5 is a ring-like member disposed so as to surround an outside of the first frame 31. The second frame 4 is a ring-like member, and is disposed so as to surround the outside of the first frame 31. The second frame 4 is housed in a groove not shown provided to the base member 5.

The first frame 31 has protrusions 32, 33, 34, and 35 protruding in respective directions corresponding to the four corners of the optical area 30A having the rectangular shape. The protrusions 32, 33 overlap the second axis J2, and the protrusions 34, 35 are located at positions overlapping the first axis J1. The protrusion 32 is coupled to the second frame 4 via a support member 36. The protrusion 33 protrudes at an opposite side to the protrusion 32 with respect to the center CE of the optical area 30A. The protrusion 33 is coupled to the second frame 4 via a support member 37.

The support members 36, 37 are disposed on the second axis J2. The support member 36 has a shaft 36A connecting the second frame 4 and the protrusion 32 to each other. The support member 37 has a shaft 37A connecting the second frame 4 and the protrusion 33 to each other. The shafts 36A, 37A each have elasticity in a torsional direction. The support member 36 and the support member 37 respectively support the both ends of the first frame 31 in the second axis J2 direction. The first frame 31 is supported by the second frame 4 with the shafts 36A, 37A having elasticity so as to be able to rotate within a predetermined range centering on the second axis J2.

The protrusion 34 is located in a space 42 formed inside the second frame 4, and can freely move. To the base member 5, there are fixed support members 45, 46 on the first axis J1. The support member 46 is located at an opposite side to the support member 45 with respect to the center CE. Both ends of the second frame 4 on the first axis J1 are supported by the base member 5 via the support member 45 and the support member 46.

The support member 45 has a shaft 45A connecting the second frame 4 and the base member 5 to each other. The support member 46 has a shaft 46A connecting the second frame 4 and the base member 5 to each other. The shafts 45A, 46A each have elasticity in a torsional direction. The second frame 4 is supported by the base member 5 with the support members 45, 46 so as to be able to rotate within a predetermined range centering on the first axis J1.

The glass plate 30 is swingable around the second axis J2 together with the first frame 31, and is further swingably supported around the first axis J1 together with the second frame 4.

The first axis J1 and the second axis J2 bisect each other at right angles, and the angle formed between the first axis J1 and a side of the optical area 30A having the rectangular shape is smaller than 90°, and the angle θ shown in the drawing is, for example, 45°. Therefore, the glass plate 30 in the present embodiment is supported so as to be able to oscillate in two directions parallel to none of the sides of the optical area 30A centering on the center CE. The oscillation directions of the glass plate 30 are preferably directions parallel to none of the sides of the optical area 30A, the axis BX, and the axis BY, and are more preferably directions having a tilt smaller than 90° with respect to the axis BX and the axis BY, respectively. As a most preferable example, the oscillation directions of the glass plate 30 each coincide with any of the directions of the first position P1, the second position P2, the third position P3, and the fourth position P4 with respect to the position P0 of the pixel Px shown in FIG. 2. Specifically, the oscillation directions of the glass plate 30 are directions at an angle of 45° with both of the axis BX and the axis BY.

The first actuator 6 is disposed between one end of the second frame 4 and the base member 5 on the second axis J2. The other end of the second frame 4 on the second axis J2 is fitted into a cutout 51 provided to the base member 5, and can freely move. It should be noted that the first actuator 6 is not required to overlap the second axis J2.

The first actuator 6 is a vibratory actuator having a magnet 61, a coil 62, a magnet holding plate 63, and a coil holding plate 64.

The magnet holding plate 63 is fixed to the second frame 4. The coil holding plate 64 is fixed to the base member 5. The magnet 61 is attached to the magnet holding plate 63, and the coil 62 is held by the coil holding plate 64 at a position opposed to the magnet 61. The magnet 61 and the coil 62 are not coupled to each other. Between the magnet 61 and the coil 62, there is disposed a gap to the extent that the magnet 61 and the coil 62 can move relatively to each other.

The second actuator 7 is disposed between the protrusion 35 and the second frame 4 on the first axis J1. The protrusion 34 located at an opposite side to the protrusion 35 is fit into the space 42 as described above, and can freely move. It should be noted that the second actuator 7 is not required to overlap the first axis J1.

The second actuator 7 is a vibratory actuator having a magnet 71, a coil 72, a magnet holding plate 73, and a coil holding plate 74.

The magnet holding plate 73 is fixed to the protrusion 35 of the first frame 31. The coil holding plate 74 is fixed to the second frame 4. The magnet 71 is attached to the magnet holding plate 73, and the coil 72 is held by the coil holding plate 74 at a position opposed to the magnet 71. The magnet 71 and the coil 72 are not coupled to each other. Between the magnet 71 and the coil 72, there is disposed a gap to the extent that the magnet 71 and the coil 72 can move relatively to each other.

FIG. 6 is a cross-sectional view of a principal part of the light path shifting device 2 shown in FIG. 5 cut along the first axis J1. In FIG. 6 and FIG. 7 described later, a normal direction of the glass plate 30 when the glass plate 30 is located at the reference position is represented as the Z axis. The Z axis is perpendicular to each of the first axis J1 and the second axis J2. The image light LL enters the glass plate 30 along the Z axis.

In the second actuator 7, the magnet 71 and the coil 72 are disposed so as to be opposed to each other. The coil 72 is an air core coil having an oval shape, and is provided with two effective sides 721, 722 extending substantially in parallel to the second axis J2. The coil 72 is positioned so that the two effective sides 721, 722 are arranged side by side along the Z axis, and is then held by the coil holding plate 74.

A south pole 711 and a north pole 712 of the magnet 71 are arranged side by side along the Z axis on an opposed surface opposed to the coil 72. The magnet 71 is a permanent magnet, and there can be used, for example, a neodymium magnet, a samarium-cobalt magnet, a ferrite magnet, and an alnico magnet. When the glass plate 30 is located at the reference position, in the second actuator 7, one of the south pole 711 and the north pole 712 of the magnet 71 is opposed to the effective side 721, and the other thereof is opposed to the effective side 722.

When energizing the coil 72, the magnet 71 moves relatively to the coil 72 along the Z axis. Thus, a driving force around the second axis J2 is applied to the first frame 31 fixed to the magnet 71, and the first frame 31 rotates around the second axis J2 together with the glass plate 30.

The drive signal processing circuit 121 is capable of switching the direction of the current flowing through the coil 72, namely the polarity of the second drive signal DS2. In accordance with the direction of the current flowing through the coil 72, the rotational direction of the first frame 31 changes. For example, in the case of the configuration in which the magnet 71 is displaced toward one side along the Z axis when the current flows in a forward direction through the coil 72, when the current flows in an opposite direction through the coil 72, the magnet 71 is displaced toward the other side along the Z axis. Therefore, the second actuator 7 rotates the first frame 31 toward the one side and the opposite side along the Z axis in accordance with the polarity of the second drive signal DS2 input to the second actuator 7 by the drive signal processing circuit 121.

FIG. 7 is a cross-sectional view of a principal part of the light path shifting device 2 shown in FIG. 5 cut along the second axis J2, and in particular, shows a configuration of the first actuator 6 and the vicinity thereof in an enlarged manner.

The magnet 61 and the coil 62 are disposed along the second axis J2 so as to be opposed to each other. The coil 62 is an air core coil having an oval shape, and is provided with two effective sides 621, 622 extending substantially in parallel to the first axis J1. The coil 62 is positioned so that the two effective sides 621, 622 are arranged side by side along the Z axis, and is then fixed to the coil holding plate 64.

A south pole 611 and a north pole 612 of the magnet 61 are arranged side by side along the Z axis on a surface opposed to the coil 62. The magnet 61 is a permanent magnet, and there can be used a neodymium magnet, a samarium-cobalt magnet, a ferrite magnet, and an alnico magnet similarly to the magnet 71. When the glass plate 30 is located at the reference position, in the first actuator 6, one of the south pole 611 and the north pole 612 of the magnet 61 is opposed to the effective side 621, and the other thereof is opposed to the effective side 622.

When energizing the coil 62, the magnet 61 moves relatively to the coil 62 along the Z axis. Thus, a driving force around the first axis J1 is applied to the second frame 4 which holds the magnet 61, and the second frame 4 rotates around the first axis J1 together with the glass plate 30.

The drive signal processing circuit 121 is capable of switching the direction of the current flowing through the coil 62, namely the polarity of the first drive signal DS1. In accordance with the direction of the current flowing through the coil 62, the rotational direction of the second frame 4 changes. For example, in the case of the configuration in which the magnet 61 is displaced toward one side along the Z axis when the current flows in a forward direction through the coil 62, when the current flows in an opposite direction through the coil 62, the magnet 61 is displaced toward the other side along the Z axis. Therefore, the first actuator 6 rotates the second frame 4 toward the one side and the opposite side along the Z axis in accordance with the polarity of the first drive signal DS1 input to the first actuator 6 by the drive signal processing circuit 121.

In the first actuator 6, the magnet holding plate 63 and the coil holding plate 64 are made of metal such as iron, and each function as a back yoke. Similarly in the second actuator 7, the magnet holding plate 73 and the coil holding plate 74 are made of metal such as iron, and each function as a back yoke. These back yokes exert an advantage of decreasing a leakage flux to increase magnetic efficiency.

By the incident angle of the image light LL to the glass plate 30 being tilted from the reference position due to the actions of the first actuator 6 and the second actuator 7, the glass plate 30 transmits the image light LL having entered the glass plate 30 while refracting the image light LL. Therefore, by changing the posture of the glass plate 30 so as to achieve the target incident angle, it is possible to control the deflection direction and the deflection amount of the image light LL.

Figure 8:
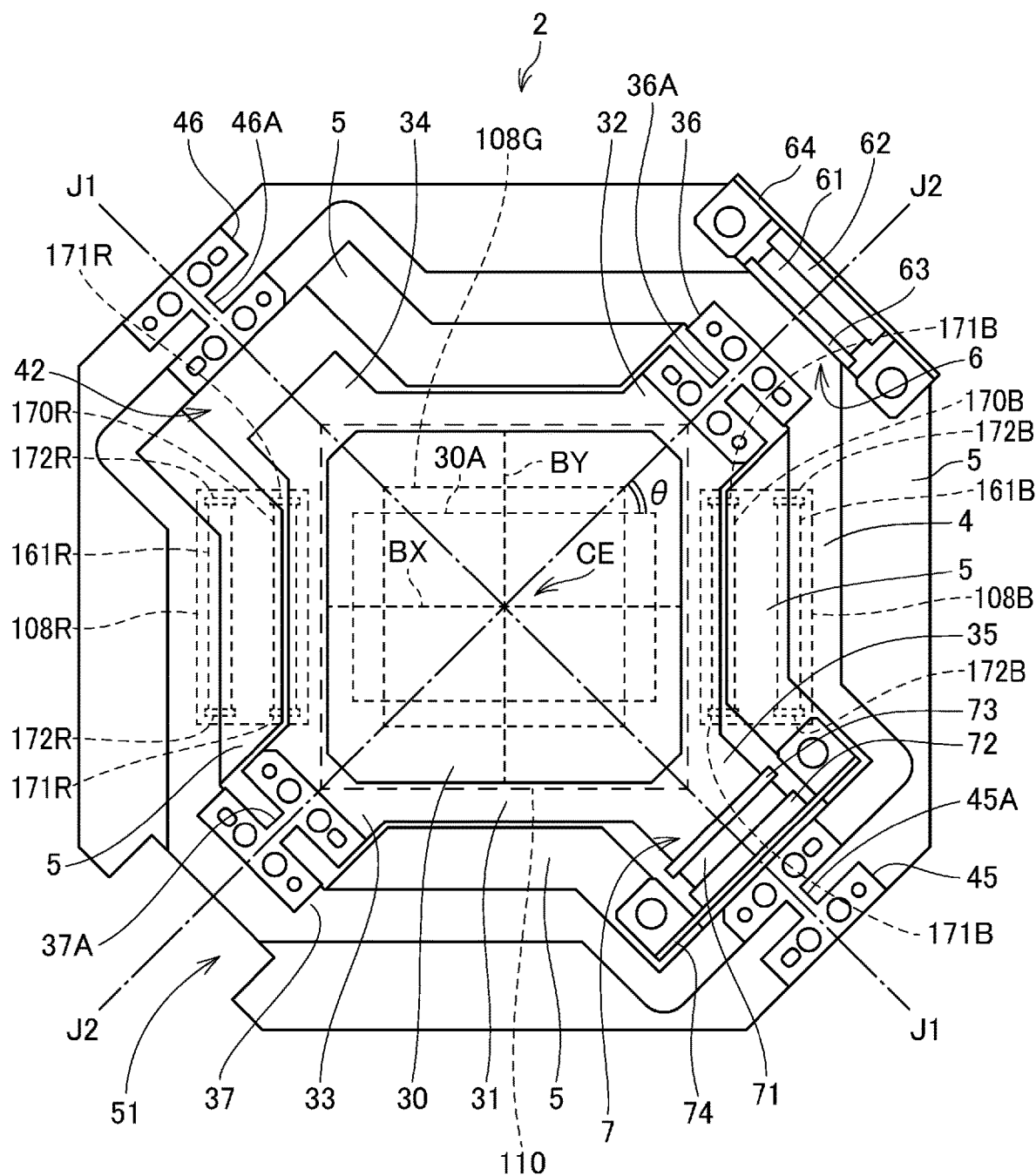
FIG. 8 is an explanatory diagram showing a relative position between a light modulator and the light path shifting device.

FIG. 8 is an explanatory diagram showing a relative position between a light modulator 108 and the light path shifting device 2. FIG. 8 shows a configuration of the light modulator 108 so as to be superimposed on the components of the light path shifting device 2 shown in FIG. 5. FIG. 8 shows the state of viewing the light path shifting device 2 and the light modulator 108 from a position of the projection optical system 112 on the light path of the image light LL.

The dichroic prism 110 is located at a position where the dichroic prism 110 overlaps the glass plate 30 of the light path shifting device 2 in the plan view along the Z axis, namely in the plan view of the glass plate 30. The liquid crystal display elements 108R, 108G, and 108B are disposed so as to be opposed to the dichroic prism 110. The liquid crystal display element 108G is located at the position where the liquid crystal display element 108G overlaps the dichroic prism 110 and the glass plate 30 in the plan view of the glass plate 30, and the liquid crystal display element 108R and the liquid crystal display element 108B are located at the opposite sides along the BX axis with respect to the dichroic prism 110.

The liquid crystal display element 108R is attached to a liquid crystal frame 161R. The position of the liquid crystal display element 108G is at an opposite side to the glass plate 30 with respect to the dichroic prism 110.

Between the liquid crystal display element 108R and the dichroic prism 110, there is disposed a polarization element 170R. The polarization element 170R is a rectangular optical member corresponding to the liquid crystal display element 108R. The red light modulated by the liquid crystal display element 108R is uniformed in polarization by the polarization element 170R, and then enters the dichroic prism 110.

The polarization element 170R is attached with a polarization element frame 171R surrounding the polarization element 170R, and the polarization element frame 171R is fixed to the liquid crystal frame 161R. Further, the liquid crystal display element 108R is attached with a fixation frame 172R surrounding the liquid crystal display element 108R, and is fixed to the liquid crystal frame 161R via the fixation frame 172R.

The liquid crystal display element 108R and the polarization element 170R are held by the polarization element frame 171R and the fixation frame 172R at appropriate positions with respect to the dichroic prism 110.

The liquid crystal display element 108B is attached to a liquid crystal frame 161B.

Between the liquid crystal display element 108B and the dichroic prism 110, there is disposed a polarization element 170B. The polarization element 170B is a rectangular optical member corresponding to the liquid crystal display element 108B. The blue light modulated by the liquid crystal display element 108B is uniformed in polarization by the polarization element 170B, and then enters the dichroic prism 110.

The polarization element 170B is attached with a polarization element frame 171B surrounding the polarization element 170B, and the polarization element frame 171B is fixed to the liquid crystal frame 161B. Further, the liquid crystal display element 108B is attached with a fixation frame 172B surrounding the liquid crystal display element 108B, and is fixed to the liquid crystal frame 161B via the fixation frame 172B.

The liquid crystal display element 108B and the polarization element 170B are held by the polarization element frame 171B and the fixation frame 172B at appropriate positions with respect to the dichroic prism 110.

Further, although not shown in the drawings, similarly to the liquid crystal display element 108R and the liquid crystal display element 108B, the liquid crystal display element 108G is coupled to a polarization element 170G, and is fixed at an appropriate position with respect to the dichroic prism 110.

The liquid crystal frames 161R, 161B, the polarization element frames 171R, 171B, and the fixation frames 172R, 172B have the rigidity with which the liquid crystal display elements 108R, 108B and the polarization elements 170R, 170B can surely be fixed. At least some of the liquid crystal frames 161R, 161B, the polarization element frames 171R, 171B, and the fixation frames 172R, 172B constitute fixation members. These fixation members are desired to have a configuration having high rigidity and capable of suppressing the weight, and are therefore preferably made of metal. In contrast, when making the fixation members from metal, an influence on the magnetic force of the first actuator 6 and the second actuator 7 of the light path shifting device 2 is concerned. It should be noted that a fixation member for the liquid crystal display element 108G is longer in distance from the light path shifting device 2 than the liquid crystal display elements 108R, 108B, and therefore has no influence on the first actuator 6 and the second actuator 7.

As shown in FIG. 8, in the present embodiment, the first actuator 6 and the second actuator 7 are disposed on the corners of the light path shifting device 2. In particular, the first actuator 6 is disposed at the end of the second frame 4 in the direction along the second axis J2, and the second actuator 7 is disposed at the end of the first frame 31 in the direction along the first axis J1. Therefore, in a plane including the glass plate 30, the first actuator 6 and the second actuator 7 are located at positions farther from the glass plate 30 compared when the first actuator 6 and the second actuator 7 are respectively located on the sides of the first frame 31 and the second frame 4. When the first actuator 6 and the second actuator 7 are supposedly located on these sides, there is a possibility that the first actuator 6 and the second actuator 7 are opposed to the fixation members. It is possible to dispose the first actuator 6 or the second actuator 7 and the fixation members at positions where these are not opposed to each other by making the length along the X axis of the whole of the light path shifting device 2 sufficiently long, but the whole of the apparatus grows in size.

In contrast, when the first actuator 6 and the second actuator 7 are disposed on the corners of the light path shifting device 2, even when the light path shifting device 2 has a size with which the side of the light path shifting device 2 and the fixation member overlap each other in the plan view, the first actuator 6 and the second actuator 7 located on the corners do not overlap the fixation member as long as the distance between the first actuator 6 and the second actuator 7 is longer than the length of the fixation member. Therefore, the concern about the mutual influence between the magnetic force of the first actuator 6 and the second actuator 7, and the variety of metal members disposed on the periphery of the dichroic prism 110 is resolved.

6. Method of Driving Light Path Shifting Device

The light path shifting device 2 oscillates the glass plate 30 in two directions, namely a first oscillation direction around the first axis J1 and a second oscillation direction around the second axis J2, using the drive signals DS to be supplied from the drive signal processing circuit 121. In the first actuator 6, a current flows through the coil 62 based on the first drive signal DS1 input from the drive signal processing circuit 121, and thus, the magnet 61 is displaced. In the second actuator 7, a current flows through the coil 72 based on the second drive signal DS2, and thus, the magnet 71 is displaced.

FIGS. 9A to 9C are timing charts showing waveforms of the drive signals DS and changes of the position of the pixel Px. In the timing chart shown in FIGS. 9A to 9C, FIG. 9A represents the waveform of the first drive signal DS1, FIG. 9B represents the waveform of the second drive signal DS2, and FIG. 9C represents the position of the pixel Px. The reference symbols t1 through t9 each represent a specific time. The reference symbols PA, PB, PC, and PD shown in FIG. 9C indicate the images displayed by the pixel Px. The images PA, PB, PC, and PD are the images displayed at the first position P1, the third position P3, the fourth position P4, and the second position P2 shown in FIG. 2, respectively.

FIGS. 9A and 9B show a signal level A of the first drive signal DS1, and a signal level B of the second drive signal DS2.

In this example, the projector 1 displays the images in the order of the images PB, PD, PC, and PA. The direction in which the light path shifting device 2 moves the light path changes in the order of the third direction F3, the second direction F2, the fourth direction F4, and the first direction F1. The first drive signal DS1 and the second drive signal DS2 each change between a positive signal level, a negative signal level, and a level of 0. Therefore, the current values of the first drive signal DS1 and the second drive signal DS2 each change between a positive value, a negative value, and 0. Each of the signal level of the first drive signal DS1 and the signal level of the second drive signal DS2 can be reworded as a value.

The first actuator 6 rotates the glass plate 30 in the normal direction around the first axis J1 when the first drive signal DS1 has the positive value, and rotates the glass plate 30 in the reverse direction around the first axis J1 when the first drive signal DS1 has the negative value. The second actuator 7 rotates the glass plate 30 in the normal direction around the second axis J2 when the second drive signal DS2 has the positive value, and rotates the glass plate 30 in the reverse direction around the second axis J2 when the second drive signal DS2 has the negative value.

The state of the signal level A=0 of the first drive signal DS1 corresponds to the state in which the first drive signal DS1 does not substantially excite the first actuator 6. In this state, the signal level A is not required to completely vanish. Further, in a period of the signal level A=0, the signal level A can be 0. Further, in the period of the signal level A=0, it is possible to create the state in which the magnetic force of the first actuator 6 is in the level of not displacing the glass plate 30, and the signal level A is not 0. In other words, it is possible to create the state in which the displacement of the glass plate 30 does not substantially occur, and the signal level A is not 0.

Similarly, the state of the signal level B=0 of the second drive signal DS2 corresponds to the state in which the second drive signal DS2 does not substantially excite the second actuator 7. In this state, the signal level B is not required to completely vanish. In a period of the signal level B=0, the signal level B can be 0. Further, in the state of the signal level B=0, it is possible to create the state in which the magnetic force of the second actuator 7 is in the level of not displacing the glass plate 30, and the signal level B is not 0. In other words, it is possible to create the state in which the displacement of the glass plate 30 does not substantially occur, and the signal level B is not 0.

The value a1 of the signal level A is a predetermined positive value, and the value a2 is a predetermined negative value. The value b1 of the signal level B is a predetermined positive value, and the value b2 is a predetermined negative value.

In FIGS. 9A to 9C, the first drive signal DS1 rises in a period from the beginning of the action to the time t1, and thus, the signal level A reaches the value a1. When the signal level A of the first drive signal DS1 is positive, and the signal level B of the second drive signal DS2 is 0, the light path shifting device 2 shifts the light path toward the third direction F3 shown in FIG. 2. Thus, the projector 1 displays the image PB.

In a period from the time t2 to the time t3, the first drive signal DS1 falls, and at the same time, the second drive signal DS2 rises, and thus, the signal level A reaches 0, and the signal level B reaches the value b1. The light path shifting device 2 shifts the light path toward the second direction F2 shown in FIG. 2 when the signal level B is positive, and the signal level A is 0. Thus, the projector 1 displays the image PD.

In a period from the time t4 to the time t5, the first drive signal DS1 falls, and at the same time, the second drive signal DS2 falls, and thus, the signal level A reaches the value a2, and the signal level B reaches 0. The light path shifting device 2 shifts the light path toward the fourth direction F4 shown in FIG. 2 when the signal level A is negative, and the signal level B is 0. Thus, the projector 1 displays the image PC.

In a period from the time t6 to the time t7, the first drive signal DS1 rises, and at the same time, the second drive signal DS2 falls, and thus, the signal level A reaches 0, and the signal level B reaches the value b2. The light path shifting device 2 shifts the light path toward the first direction F1 shown in FIG. 2 when the signal level B is negative, and the signal level A is 0. Thus, the projector 1 displays the image PA.

In a period from the time t8 to the time t9, the first drive signal DS1 rises, and at the same time, the second drive signal DS2 rises, and the signal level A reaches the value a1, and the signal level B reaches 0. Thus, the projector 1 displays the image PB.

The light path shifting device 2 shifts the light path toward the third direction F3 and the fourth direction F4 with the first actuator 6. Further, the light path is shifted toward the first direction F1 and the second direction F2 with the second actuator 7. In other words, in the process of shifting the light path toward the four directions, namely the first direction F1 through the fourth direction F4, the state in which the first actuator 6 and the second actuator 7 are excited at the same time is not required.

Therefore, as shown in FIGS. 9A to 9C, in the period of displaying the image, since a period in which the signal level A and the signal level B are kept at positive values at the same time, and a period in which the signal level A and the signal level B are kept at negative values at the same time do not exist, it is possible to suppress the current values of the drive signals DS output by the drive signal processing circuit 121, and it is possible to suppress the consumption of the power for driving the light path shifting device 2.

Further, as shown in the period between t2 and t3, the period between t4 and t5, and so on, when the direction in which the light path is shifted is switched, it is possible to make the first actuator 6 and the second actuator 7 individually operate. Specifically, it is possible for the rising timing or the falling timing of the first drive signal DS1 and the rising timing or the falling timing of the second drive signal DS2 to overlap each other. Therefore, it is possible to switch the shift direction of the light path in a short time.

In order to prevent the projection image 101A from becoming unclear, it is desirable not to display the image during a period of switching the shift direction of the light path. As shown in FIGS. 9A to 9C, since the light path shifting device 2 is capable of switching the shift direction of the light path in a short time, a period in which the image is not displayed is short, and the proportion of a period in which the image can be displayed is high. Thus, it is possible to project the projection image 101A high in resolution feeling and high in display quality.

As described hereinabove, in the method of driving the light path shifting device 2, the light path shifting device 2 includes the glass plate 30 having the optical area 30A which has a rectangular shape in plan view, and which the light enters, the first actuator 6, and the second actuator 7. The first actuator 6 displaces the glass plate 30 around the first axis J1 which passes through the center CE of the optical area 30A in the plan view, and which forms an angle smaller than 90° with the first side of the optical area 30A. The second actuator 7 displaces the glass plate 30 around the second axis J2 which passes through the center CE of the optical area 30A, and which is perpendicular to the first axis J1. The method of driving the light path shifting device 2 includes the steps of inputting the first drive signal DS1 into the first actuator 6 to thereby excite the first actuator 6, inputting the second drive signal DS2 into the second actuator 7 to thereby excite the second actuator 7, and setting the value of the second drive signal DS2 to a value for substantially stopping the excitation of the second actuator 7 in the period of exciting the first actuator 6.

In the light path shifting device 2, by making the first actuator 6 operate, it is possible to oscillate the glass plate 30 around the first axis J1 which forms an angle smaller than 90° with the first side of the optical area 30A. Further, by making the second actuator 7 operate, it is possible to oscillate the glass plate 30 around the second axis J2 perpendicular to the first axis J1.

It is possible for the method of driving the light path shifting device 2 to shift the image light LL in a plurality of directions different from each other, and nonparallel to the sides of the optical area 30A by making either one of the first actuator 6 and the second actuator 7 operate. In this drive method, when driving the light path shifting device 2, the excitation of the second actuator 7 is substantially stopped during the period of exciting the first actuator 6. For example, in the drive method shown in FIGS. 9A to 9C, in the period between t1 and t2 and the period between t5 and t6, while exciting the first actuator 6 with the first drive signal DS1, the signal level of the second drive signal DS2 is 0, and thus, the second actuator 7 is substantially stopped. Thus, the operation of shifting the image light LL to make the display image high-resolution can be performed with low power consumption.

The drive method described above includes the steps of exciting the second actuator 7 with the second drive signal DS2, and setting the value of the first drive signal DS1 to a value for substantially stopping the excitation of the first actuator 6 in the period of exciting the second actuator 7.

For example, in the period between t3 and t4 and the period between t7 and t8, while the second drive signal DS2 is in the state of exciting the second actuator 7, the signal level of the first drive signal DS1 is 0, and thus, the excitation of the first actuator 6 is substantially stopped. Thus, the operation of shifting the image light LL to make the display image high-resolution can be performed with low power consumption.

In the drive method described above, assuming the value of the second drive signal DS2 as B, the value for stopping the excitation of the second actuator 7 includes B=0. In this case, by setting the value B of the second drive signal DS2 to B=0, it is possible to surely set the excitation of the second actuator 7 to the state of being substantially stopped, and it is possible to further reduce the power consumption of the light path shifting device 2.

The drive method described above includes a first period in which B=b1 is set and a second period in which B=b2 is set defining the value of the second drive signal DS2 as B, and assuming the value b1 as a constant satisfying b1>0 and the value b2 as a constant satisfying b2<0. For example, in FIGS. 9A to 9C, the period between t3 and t4 is an example of a first period, and the period between t7 and t8 is an example of a second period. In these periods, by setting the value A of the first drive signal DS1 to the value for substantially stopping the excitation of the first actuator 6, it is possible to further reduce the power consumption of the light path shifting device 2.

The drive method described above includes either one of a third period in which A>0 and B=0 are set and a fourth period in which A<0 and B=0 are set between the first period and the second period defining the value of the first drive signal DS1 as A. For example, in FIGS. 9A to 9C, the period between t5 and t6 is an example of the fourth period. Further, when performing the same operation started at the time t9 as the operation started at the time t1 and subsequent times, it is possible to include the period of the time t1 through the time t2 in which A>0 and B=0 are set following the period between t7 and t8 corresponding to the second period. In this case, the period between t1 and t2 corresponds to an example of the third period. In these periods, by setting either of the values of the first drive signal DS1 and the second drive signal DS2 to the value for substantially stopping the excitation of the actuator, it is possible to further reduce the power consumption of the light path shifting device 2.

In the drive method described above, assuming the value a1 as a constant satisfying a1>0, and the value a2 as a constant satisfying a2<0, it is possible to set A=a1 in the third period, and A=a2 in the fourth period. As described above, the period between t1 and t2 corresponds to an example of the third period, and the period between t5 and t6 corresponds to an example of the fourth period. In these periods, by exciting the first actuator 6 with the first drive signal DS1, and substantially stopping the excitation of the second actuator 7, it is possible to further reduce the power consumption of the light path shifting device 2.

The drive method described above includes a fifth period in which the value A of the first drive signal DS1 and the value B of the second drive signal DS2 change between the first period and the third period, or between the first period and the fourth period. For example, in FIGS. 9A to 9C, in the period between t2 and t3, the period between t4 and t5, the period between t6 and t7, and the period between t8 and t9, the values of the first drive signal DS1 and the second drive signal DS2 change. These periods each correspond to an example of the fifth period. According to this drive method, by changing the value of the first drive signal DS1 and the value of the second drive signal DS2 at the same time, it is possible to complete the operation of shifting the image light LL in a short time.

For example, it is possible for the light path shifting device 2 to oscillate the glass plate 30 together with the second frame 4 by making the second actuator 7 operate, and to oscillate the glass plate 30 together with the first frame 31 to operate the first actuator 6. According to this configuration, since there is no chance for the action of the first actuator 6 and the action of the second actuator 7 to interfere with each other, the operation of making the first actuator 6 and the second actuator 7 act at the same time to shift the image light LL can be completed in a short time. Therefore, there is an advantage that it is possible to move the glass plate 30 in a short time, and even when stopping the display while the glass plate 30 is moving, the resolution feeling of the projection image 101A is not damaged.

In the drive method described above, the light path shifting device 2 makes the glass plate 30 guide the incident light to the second position P2 in the first period, and makes the glass plate 30 guide the incident light to the third position P3 in the third period. Further, the light path shifting device 2 makes the glass plate 30 guide the incident light to the fourth position P4 in the fourth period, and makes the glass plate 30 guide the incident light to the first position P1 in the second period.

According to this method, the image light LL is guided to the respective positions different from each other in the first period of setting B=b1 and A=0, the second period of setting B=b2 and A=0, the third period of setting A>0 and B=0, and the fourth period of setting A<0 and B=0. Therefore, it is possible to shift the image light LL to the four different positions by exciting the first actuator 6 and the second actuator 7 substantially one by one, and thus, it is possible to realize the high resolution of the projection image 101A with lower power consumption.

The optical system obtained by combining the drive signal processing circuit 121 with the light path shifting device 2 is provided with the light path shifting device 2 including the glass plate 30, the first actuator 6, and the second actuator 7, and the drive signal processing circuit 121. In the glass plate 30, the light enters the optical area 30A having a rectangular shape in the plan view. The first actuator 6 displaces the glass plate 30 around the first axis J1 which passes through the center CE of the optical area 30A in the plan view, and which forms an angle smaller than 90° with the first side of the optical area 30A. The second actuator 7 displaces the glass plate 30 around the second axis J2 which passes through the center CE of the optical area 30A, and which is perpendicular to the first axis J1. The drive signal processing circuit 121 executes the steps of outputting the first drive signal DS1 to the first actuator 6 to thereby excite the first actuator 6, outputting the second drive signal DS2 to the second actuator 7 to thereby excite the second actuator 7, and setting the value of the second drive signal DS2 to the value for substantially stopping the excitation of the second actuator 7 during the period of exciting the first actuator 6.

The projector 1 is provided with the light source 102, and the light modulator 108 for modulating the light emitted from the light source 102. The projector 1 is provided with the light path shifting device 2 including the glass plate 30, the first actuator 6, and the second actuator 7, the drive signal processing circuit 121, and the projection optical system 112. In the glass plate 30, the light modulated by the light modulator 108 enters the optical area 30A having a rectangular shape in the plan view. The first actuator 6 displaces the glass plate 30 around the first axis J1 which passes through the center CE of the optical area 30A in the plan view, and which forms an angle smaller than 90° with the first side of the optical area 30A. The second actuator 7 displaces the glass plate 30 around the second axis J2 which passes through the center CE of the optical area 30A, and which is perpendicular to the first axis J1. The drive signal processing circuit 121 executes the steps of outputting the first drive signal DS1 to the first actuator 6 to thereby excite the first actuator 6, outputting the second drive signal DS2 to the second actuator 7 to thereby excite the second actuator 7, and setting the value of the second drive signal DS2 to the value for substantially stopping the excitation of the second actuator 7 during the period of exciting the first actuator 6.

In the light path shifting device 2, by making the first actuator 6 operate, it is possible to oscillate the glass plate 30 around the first axis J1 which forms an angle smaller than 90° with the first side of the optical area 30A. Further, by making the second actuator 7 operate, it is possible to oscillate the glass plate 30 around the second axis J2 perpendicular to the first axis J1.

According to the optical system and the projector 1 described above, it is possible to shift the image light LL in a plurality of directions different from each other, and nonparallel to the sides of the optical area 30A by making either one of the first actuator 6 and the second actuator 7 operate. When driving the light path shifting device 2, the excitation of the second actuator 7 is substantially stopped during the period of exciting the first actuator 6. For example, in FIGS. 9A to 9C, in the period between t1 and t2 and the period between t5 and t6, while exciting the first actuator 6 with the first drive signal DS1, the value of the second drive signal DS2 is 0, and thus, the excitation of the second actuator 7 is substantially stopped. Thus, the operation of shifting the image light LL to make the display image high-resolution can be performed with low power consumption.

7. Other Embodiments

The embodiment described above is a preferred embodiment of the present disclosure. It should be noted that the present disclosure is not limited to the embodiment described above, but can be implemented with a variety of modifications within the scope or the spirit of the present disclosure.

For example, the description is presented assuming that the first actuator 6 has the configuration in which the magnet 61 is fixed to the second frame 4, the coil 62 is fixed to the base member 5, and the second frame 4 is displaced together with the magnet 61 by energizing the coil 62, but this is illustrative only. As a modified example, it is possible to adopt a configuration in which the coil 62 is fixed to the second frame 4, the magnet 61 is fixed to the base member 5, and the second frame 4 is displaced by energizing the coil 62. Similarly, the description is presented assuming that the second actuator 7 has the configuration in which the magnet 71 is fixed to the first frame 31, the coil 72 is fixed to the second frame 4, and the first frame 31 is displaced together with the magnet 71 by energizing the coil 72, but this is illustrative only. As a modified example, it is possible to adopt a configuration in which the coil 72 is fixed to the first frame 31, the magnet 71 is fixed to the second frame 4, and the first frame 31 is displaced by energizing the coil 72.

Further, in the embodiment described above, there is described the configuration of using the vibratory actuator which makes the magnet and the coil be opposed to each other to generate the drive force as a Lorentz force as the first actuator 6 and the second actuator 7. The present disclosure is not limited thereto, and it is possible to use an actuator which operates on another principle. It is possible to adopt, for example, a piezo actuator.

In the embodiment described above, it is possible for the projector 1 to have a configuration provided with a sensor for detecting the direction of the displacement and the amount of the displacement of the glass plate 30. In this case, it is possible for the control circuit 120 to be provided with a function of correcting the drive signals DS based on the detection result of the sensor.

The waveforms of the first drive signal DS1 and the second drive signal DS2 illustrated in FIGS. 9A and 9C are a typical example, and are not intended to limit the actual signal waveforms to those coinciding with FIGS. 9A to 9C. Further, the explanatory diagram of the optical system shown in FIG. 1 and the functional block diagram shown in FIG. 3 are the diagrams schematically showing the configuration example of the projector 1, but do not limit the target apparatus to which the present disclosure is applied.

What is claimed is:

1. A method of driving an optical device comprising:
    an optical device including
        an optical member having an optical area on which light incidents, the optical area having a rectangular shape in a plan view,
        a first actuator configured to displace the optical member around a first axis which passes through a center of the optical area in the plan view, and the first axis forms an angle smaller than 90° with a first side of the optical area, and
        a second actuator configured to displace the optical member around a second axis which passes through the center of the optical area, and the second axis is perpendicular to the first axis,
    the method including:
        exciting the first actuator by inputting a first drive signal to the first actuator;
        exciting the second actuator by inputting a second drive signal to the second actuator; and
        setting a value of the second drive signal to a value for substantially stopping exciting the second actuator in a period of the exciting the first actuator.

2. The method of driving the optical device according to claim 1, further comprising:
    setting a value of the first drive signal to a value for substantially stopping exciting the first actuator in a period of the exciting the second actuator.

3. The method of driving the optical device according to claim 1, wherein
    the value for stopping exciting the second actuator includes B=0, where
    B is the value of the second drive signal.

4. The method of driving the optical device according to claim 1, wherein
    the exciting the second actuator includes
    a first period in which B=b1, and
    a second period in which B=b2, where
    B is the value of the second drive signal,
    b1 is a constant satisfying b1>0, and
    b2 is a constant satisfying b2<0.

5. The method of driving the optical device according to claim 4, wherein
    the setting the value of the second drive signal includes one of a third period in which A>0 and B=0, and a fourth period in which A<0 and B=0 between the first period and the second period, where
    A is a value of the first drive signal.

6. The method of driving the optical device according to claim 5, wherein
    assuming a1 as a constant satisfying a1>0, and a2 as a constant satisfying a2<0,
    A=a1 in the third period, and
    A=a2 in the fourth period, where
    a1 is a constant satisfying a1>0, and
    a2 is a constant satisfying a2<0.

7. The method of driving the optical device according to claim 5, wherein
    the value A and the value B change between the first period and the third period, or between the first period and the fourth period.

8. An optical system comprising:
    an optical device including
        an optical member having an optical area on which light incidents, the optical area having a rectangular shape in a plan view,
        a first actuator configured to displace the optical member around a first axis which passes through a center of the optical area in the plan view, and the first axis forms an angle smaller than 90° with a first side of the optical area, and a second actuator configured to displace the optical member around a second axis which passes through the center of the optical area, and the second axis is perpendicular to the first axis; and a drive circuit configured to perform exciting the first actuator by outputting a first drive signal to the first actuator, exciting the second actuator by outputting a second drive signal to the second actuator, and setting a value of the second drive signal to a value for substantially stopping exciting the second actuator in a period of the exciting the first actuator.

9. A display comprising:

a light source;

a light modulator configured to modulate light emitted from the light source;

an optical device including an optical member having an optical area on which light modulated by the light modulator incidents, the optical area having a rectangular shape in a plan view, a first actuator configured to displace the optical member around a first axis which passes through a center of the optical area in the plan view, and the first axis forms an angle smaller than 90° with a first side of the optical area, and a second actuator configured to displace the optical member around a second axis which passes through the center of the optical area, and the second axis is perpendicular to the first axis;

a drive circuit; configured to perform exciting the first actuator by outputting a first drive signal to the first actuator, exciting the second actuator by outputting a second drive signal to the second actuator, and setting a value of the second drive signal to a value for substantially stopping exciting the second actuator in a period of the exciting the first actuator; and an optical system configured to transmit the light transmitted through the optical device.

* * * * *